(12) United States Patent
McCutcheon et al.

(10) Patent No.: US 7,198,144 B2
(45) Date of Patent: *Apr. 3, 2007

(54) MANUALLY ADJUSTABLE CLUTCH ASSEMBLY

(75) Inventors: Steven E. McCutcheon, Fort Wayne, IN (US); Kevin F. Schlosser, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/999,448

(22) Filed: Nov. 30, 2004

(65) Prior Publication Data

US 2006/0113156 A1 Jun. 1, 2006

(51) Int. Cl.
*F16D 13/75* (2006.01)
(52) U.S. Cl. ............................. 192/70.25; 192/111 R
(58) Field of Classification Search .................. None
See application file for complete search history.

(56) References Cited

U.S. PATENT DOCUMENTS

| 1,016,427 | A | | 2/1912 | Morse |
| 1,063,998 | A | | 6/1913 | Morse |
| 2,409,013 | A | | 10/1946 | Bodmer |
| 2,758,691 | A | | 8/1956 | Palm |
| 2,874,816 | A | | 2/1959 | Dehn |
| 4,832,164 | A | | 5/1989 | Flotow |
| 4,953,680 | A | | 9/1990 | Flotow et al. |
| 5,238,093 | A | * | 8/1993 | Campbell ................ 192/30 W |
| 5,320,205 | A | | 6/1994 | Kummer et al. |
| 5,526,913 | A | * | 6/1996 | Tarlton et al. ........... 192/70.25 |
| 6,109,412 | A | | 8/2000 | Cole et al. |
| 2004/0055847 | A1 | | 3/2004 | Hirschmann et al. |
| 2006/0116232 | A1 | * | 6/2006 | McCutcheon ................ 475/72 |

* cited by examiner

*Primary Examiner*—Saul Rodriguez
(74) *Attorney, Agent, or Firm*—Brooks Kushman P.C.

(57) ABSTRACT

A manual adjustment mechanism for a clutch is provided wherein an adjusting gear rotates an adjusting ring relative to a pressure plate that are interconnected by means of inclined surfaces or threaded surfaces. The adjustment gear is disposed inboard of a diaphragm spring and is rotated manually with access being provided through the diaphragm spring. The adjusting gear and inclined surfaces may be protected by contamination baffles. The adjusting gear may be locked in place between service operations by means of interlocking elements.

14 Claims, 7 Drawing Sheets

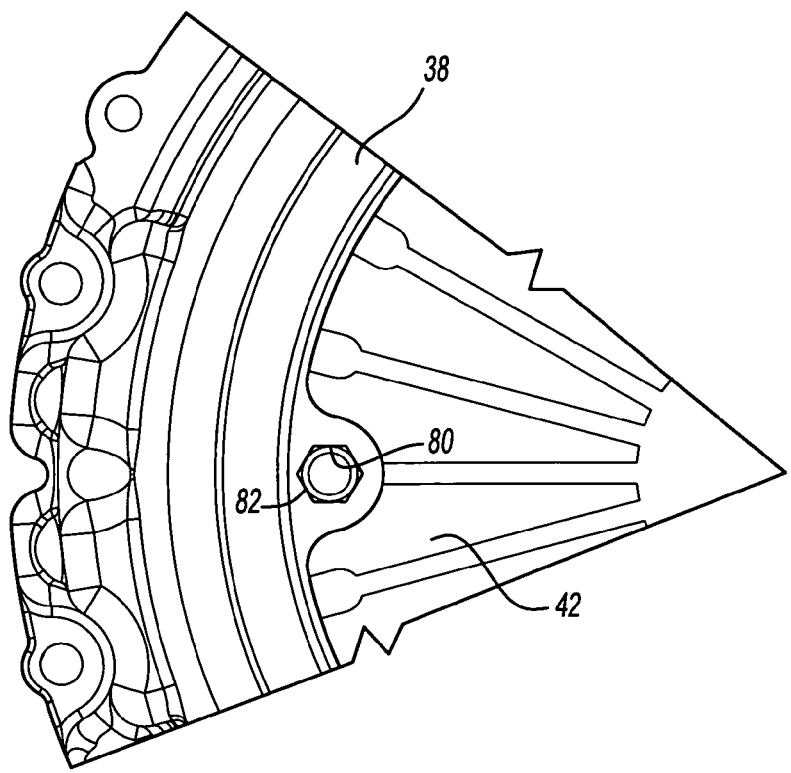
*Fig-11*
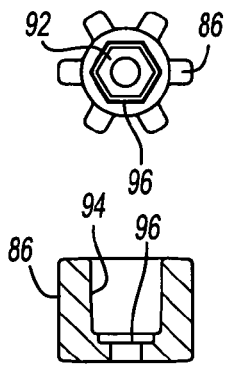
*Fig-13A*
*Fig-13B*
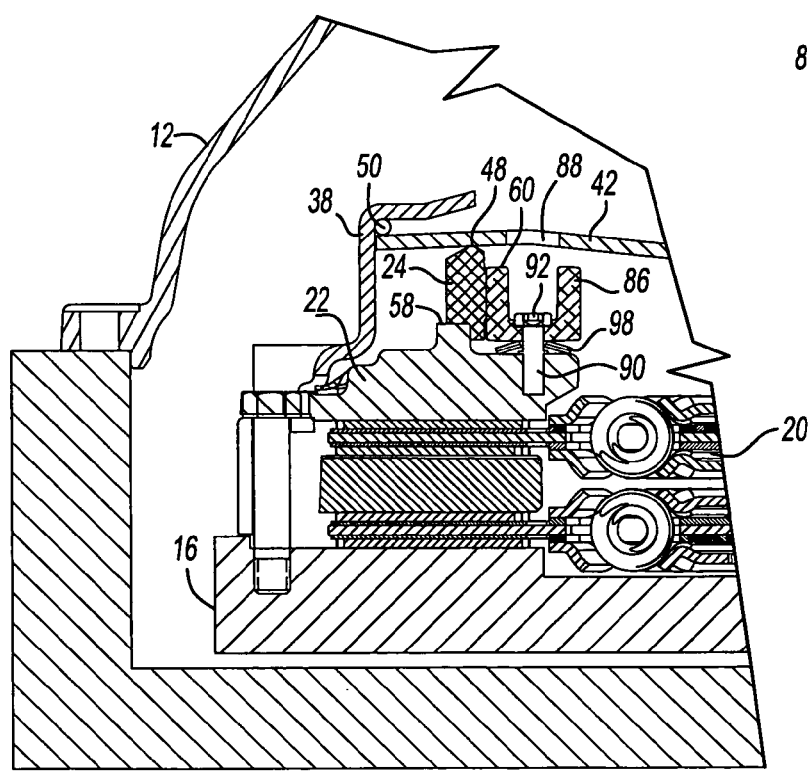
*Fig-12*

MANUALLY ADJUSTABLE CLUTCH ASSEMBLY

BACKGROUND OF THE INVENTION

1. Field of the Invention

The present invention relates to a manually adjustable clutch that may be adjusted without disassembly of the clutch assembly.

2. Background Art

Clutch assemblies are used to control the transmission of torque from an engine to a multiple speed gear transmission. Clutches generally have a plurality of plates with friction engaging surfaces that transmit torque when the clutch plates are compressed and interrupt torque transfer when pressure is released from the clutch plates. All clutches are subject to wear over time and require adjustment to provide a desired clutch engagement position for optimal performance.

Automatically adjusting clutches have been developed that do not require manual adjustment by a mechanic, however, automatically adjusting clutches require complicated mechanical linkages that add cost to the clutch assembly. Automatically adjusting clutches also require additional parts that add weight and may complicate clutch operation.

Manually adjusted clutches may provide the optimal performance associated with a properly adjusted clutch but require periodic manual adjustments. Relative movement between the adjusting ring and clutch cover may change the orientation of a diaphragm spring within the clutch to adjust the clutch. Currently, manually adjusted clutches may have threaded adjusting rings that interface with the threads embedded in the clutch housing. Alternatively, a gear may be provided that engages gear teeth on an inner diameter of an adjusting ring. The gear may be rotated to drive the adjusting ring and turn the adjusting ring relative to the clutch cover on threads provided between the clutch cover and the adjusting ring.

An example of this type of a clutch adjustment mechanism is disclosed in U.S. Pat. No. 4,832,164. The adjustment mechanism described in the '164 patent may be adversely affected by contamination becoming lodged between adjustment component. Also, the adjusting ring can move as a result of inertial forces from engine rotation and engine torsional vibration. If the adjusting ring moves, the clutch may go out of adjustment and require readjustment to maintain optimal performance.

These and other problems and disadvantages are addressed by applicant's invention as summarized below.

SUMMARY OF THE INVENTION

According to one aspect of the present invention, a manually adjustable clutch assembly is provided. The clutch assembly includes a housing having a cover that has a pivot ring. A plurality of clutch plates are disposed in the housing that are shifted in an axial direction between an engaged torque transferring position and a disengaged non-torque transferring position. A pressure plate is moveable relative to the clutch in the axial direction. An adjusting ring having a first inclined portion that engages a second inclined portion on the pressure plate has a fulcrum. A clutch release bearing has a diaphragm spring and an axially shifted release bearing assembly. The release bearing assembly has anti-friction bearing and the diaphragm spring engages the fulcrum of the adjusting ring. The diaphragm spring is pivoted on the pivot of the cover when the release bearing assembly is shifted to shift the clutch between the engaged position and disengaged position. An adjusting gear engages the adjusting ring to cause the adjusting gear to move circumferentially relative to the pressure plate when the first and second inclined portions change the axial spacing of the fulcrum relative to the clutch. The adjusting gear is accessible from outside the housing to allow the clutch to be manually adjusted without opening the housing.

According to other aspects of the invention, the adjusting gear engages the adjusting ring on the opposite axial side of the diaphragm spring from where the adjusting gear is accessible from outside the housing. The first and second inclined services may screw threads or, alternatively, may be ramp surfaces. The adjusting gear may be a gear disposed on a shaft that is piloted in a hole in the pressure plate on the inner end of the shaft and also may have a tool engagement feature on the outer end of the shaft that may receive a tool that is used to rotate the gear. The adjusting ring may have a plurality of gear teeth that are engaged by the gear of the adjusting gear wherein rotation of the adjusting gear causes the adjusting ring to rotate. The plurality of gear teeth extend circumferentially around all or part of the adjusting ring.

According to other aspects of the invention, the pressure plate may have a baffle that is disposed radially inboard of the adjusting ring. The baffle may be a cast portion of the pressure plate. Alternatively, the baffle may be an annular member that is assembled to the pressure plate.

According to other aspects of the invention, the adjusting gear may have a lock that selectively prevents rotation of the adjusting gear and the adjusting ring. A lock may be a portion of the diaphragm spring that is engaged by the adjusting gear and the adjusting gear may have a spring that biases the gear into engagement with the diaphragm spring. Alternatively, the lock may be provided by the adjusting gear which has a tool engagement head that engages the housing in a first position to lock the adjusting gear. The tool engagement head may be moved to a second position in which the tool engagement head does not engage the housing. The adjusting gear is normally biased to the first position but is shifted to the second position when a tool engages the head to turn the head for adjustment purposes. Alternatively, the adjustment gear may be disposed within the housing but be accessible by a tool that is inserted through a bore in the housing and an opening in a diaphragm spring. A tool engagement head may be provided that is rotatable with the adjusting gear.

These aspects of the invention and other features will be better understood in view of the attached drawings and following detailed description of several embodiments of the invention.

BRIEF DESCRIPTION OF THE DRAWINGS

FIG. 11 is a fragmentary elevation view of a housing and adjusting gear lock;

FIG. 12 is a fragmentary cross-sectional view of an alternative adjusting gear lock wherein the adjusting gear interlocks with an adjustment bolt head;

FIG. 13a a plan view of a hex key socket engagement of a locking adjusting gear; and FIG. 13b is a cross-sectional view of a locking adjusting gear.

DETAILED DESCRIPTION OF THE PREFERRED EMBODIMENT(S)

Figure 1:
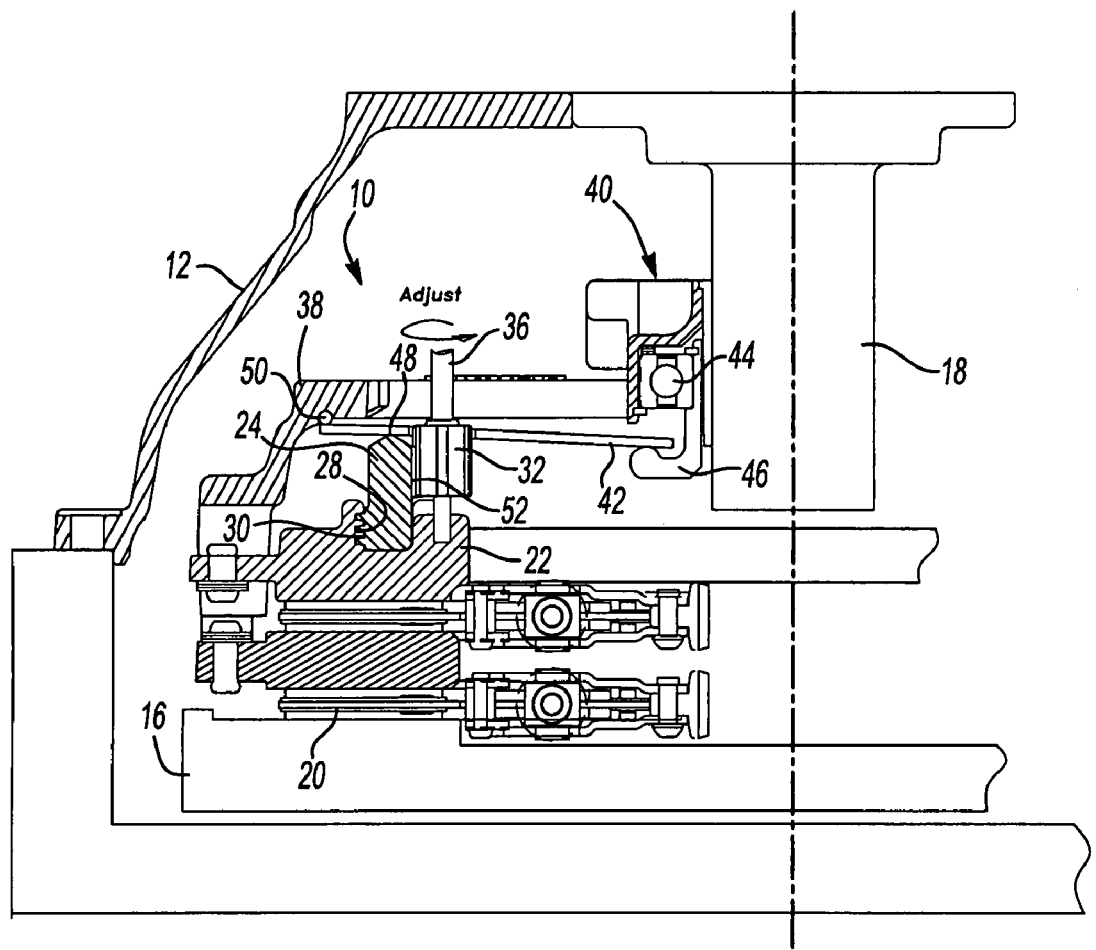
FIG. 1 is a fragmentary cross-sectional view of a manually adjustable clutch assembly.

Referring to FIG. 1, one embodiment of a clutch assembly 10 is shown within a transmission housing 12. The clutch assembly 10 operatively engages the engine flywheel 16. An output shaft 18 for a multi-speed transmission receives torque from the flywheel 16 through the clutch assembly 10. A clutch 20, or clutch pack, selectively engages the flywheel 16 when pressure is applied by a pressure plate 22. The same reference numerals will be used for similar parts in the several embodiments disclosed.

An adjusting ring 24 is associated with the pressure plate 22. The adjusting ring 24 is rotatably connected to the pressure plate 22 to permit adjustment of the height of the pressure plate including the adjusting ring 24. An external thread 28 is provided on the adjusting ring 24 that engages an internal thread 30 that is provided on the pressure plate 22. An adjusting gear 32 is assembled to an adjustment shaft 36. The adjustment shaft 36 and adjusting gear 32 are rotated to adjust the position of the adjusting ring 24 on the pressure plate 22. The adjustment shaft 36 extends through a clutch cover 38 so that it may be manually adjusted with a tool that is inserted through an access hole in the transmission housing 12.

A clutch release assembly 40 engages a diaphragm spring 42. An anti-friction bearing 44 is provided as part of the clutch release assembly 40. A collar 46 operatively engages the diaphragm spring 42 that engages a fulcrum 48 and pivots the diaphragm spring 42 on a pivot ring 50. Fulcrum 48 is provided on the adjusting ring 24. The diaphragm spring 42 engages the pivot ring 50 on the cover 38. When the clutch is disengaged, diaphragm spring 42 is flexed by the collar 46 to release the pressure applied by the pressure plate 22 to the clutch 20.

The adjusting gear 32 engages a plurality of gear teeth 52 that may be provided on a portion of the adjusting ring 24 or may be provided around the entire inner diameter of adjusting ring 24. The adjusting gear 32 may be rotated to rotate the adjusting ring 24 relative to the pressure plate 22. The adjusting gear 32 engages the teeth 52 on all or a portion of the inner diameter of the adjusting ring 24.

Figure 2:
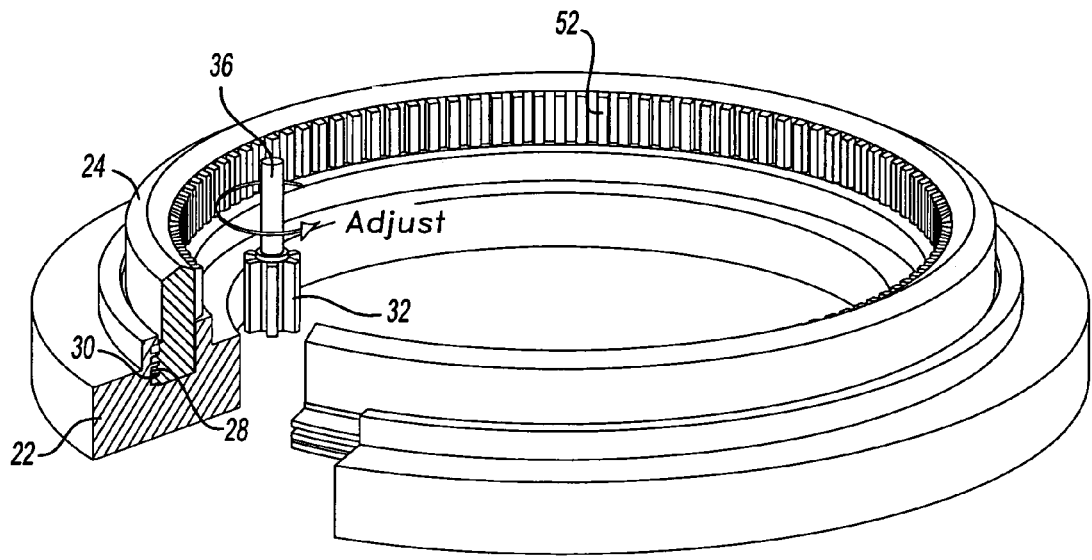
FIG. 2 is perspective view of a pressure plate, adjusting ring and adjusting gear that have a threaded connection.
Figure 3:
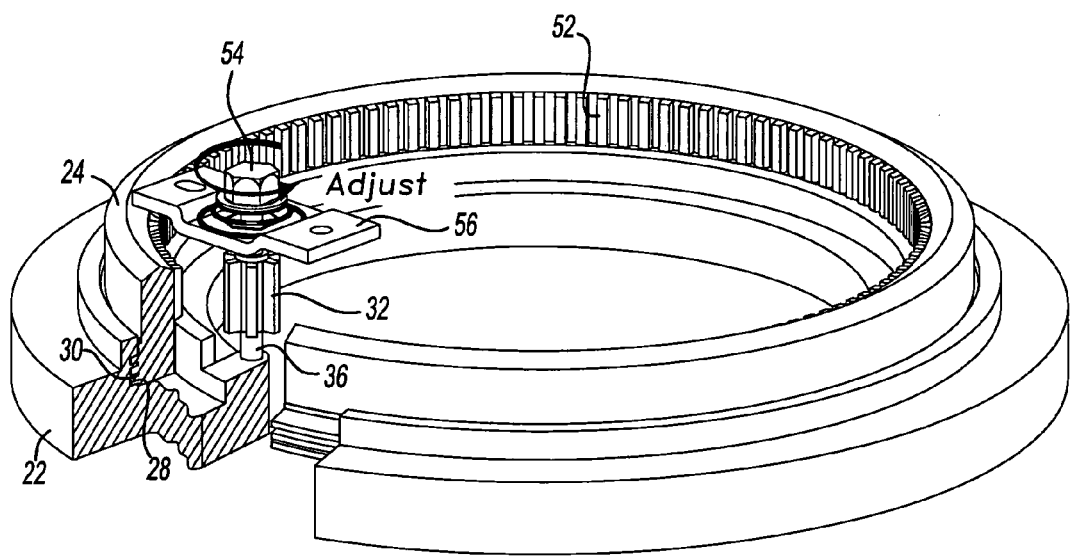
FIG. 3 is a perspective view of a pressure plate adjusting ring and adjusting gear.

Referring to FIGS. 2 and 3, the adjustment feature is shown in isolation and in greater detail. The pressure plate 22 and adjusting ring 24 are partially cut away to show the inner engaged threads 28 and 30. The adjusting gear 32 is rotated by the adjustment shaft 36 to move the adjusting ring 24 relative to pressure plate 22. The adjusting gear 32 engages the gear teeth 52. The adjustment shaft 36 is preferably piloted in the pressure plate 22 and is mounted to the cover 38, not shown in FIGS. 2 and 3. The adjustment shaft 36 has a hex head 54 on one end that may be engaged by a socket tool to rotate the adjustment gear 32. A bracket 56 is provided to mount the adjustment shaft 36 to the cover 38. As the adjusting ring 24 is moved circumferentially relative to the pressure plate 22, the height of the pressure plate 22 and adjusting ring 24 in combination may be increased to make up for wear of the clutch plates.

Figure 4:
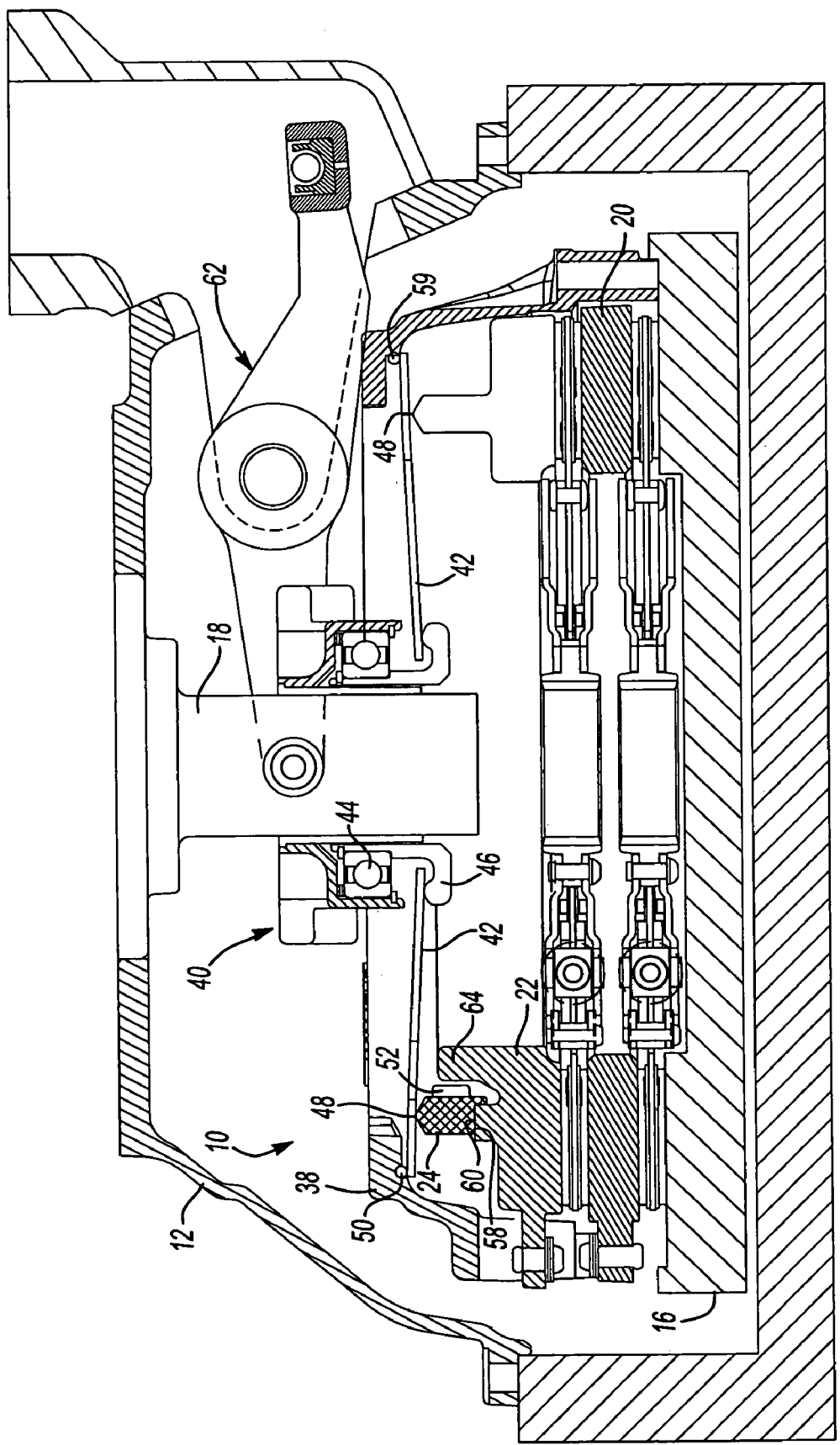
FIG. 4 is a cross-sectional view of a manually adjustable clutch assembly.

Referring to FIG. 4, an alternative embodiment of the clutch assembly 10 is shown within a transmission housing 12. The engine flywheel 16 is engaged by the clutch 20 wherein the pressure plate 22 exerts pressure on clutch 20. Adjusting ring 24 is secured to the pressure plate 22. While not shown in FIG. 4, an adjusting gear 32 is provided that engages the gear teeth 52 as previously described with reference to the embodiment of FIGS. 1–3. The clutch release assembly 40 and diaphragm spring 42 operate in a manner similar to FIG. 1 and will not be repeated here for brevity. The interface between adjusting ring 24 and pressure plate 22 is characterized by an inclined surface 58 on the pressure plate that engages inclined surface 60 on the adjustment ring 24. As the adjusting ring 24 is rotated relative to the pressure plate 22, the effective height of the pressure plate 22 and adjusting ring 24 in combination may be changed to provide optimum clutch engagement performance.

FIG. 4 shows the clutch actuator assembly 62 that is connected by means of a linkage to a clutch pedal as is well known in the art. The clutch actuator assembly 62 is used to shift the clutch release assembly 40 pivoting the diaphragm spring 42 on the pivot ring 50. The embodiment shown in FIG. 4 features a cast contamination baffle 64 that is cast as part of the pressure plate 22 and is intended to shield the gear teeth 52 and inclined surfaces 58, 60 from foreign material during operation of the clutch.

Figure 5:
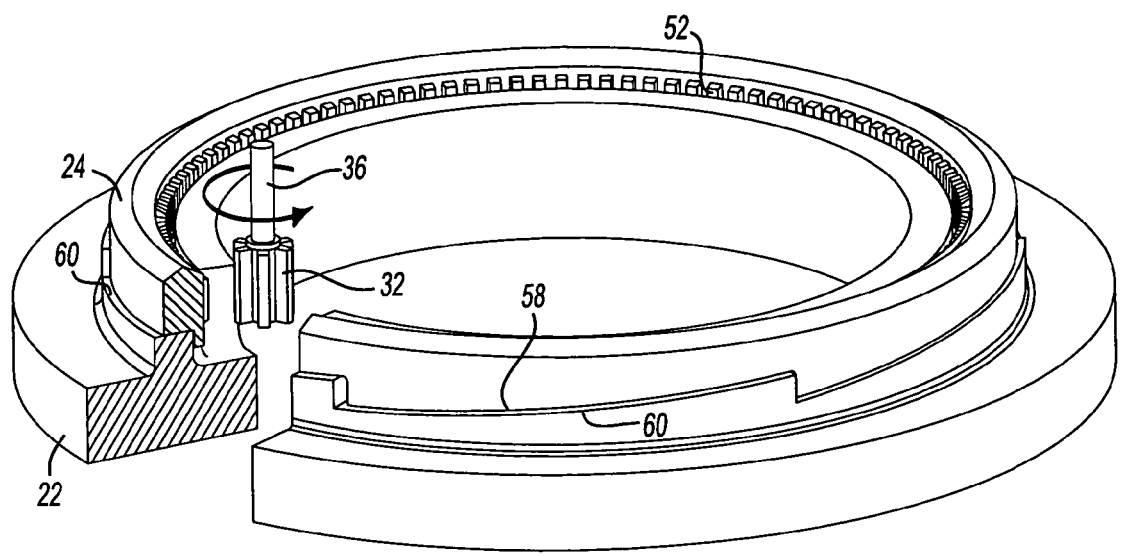
FIG. 5 is a perspective view of a pressure plate, adjusting ring and adjusting gear having ramp surfaces.

Referring to FIG. 5, an adjustment mechanism of the embodiment of FIG. 4 is shown in isolation and in greater detail. The pressure plate 24 is held in engagement with the adjusting ring 24 with inclined surfaces 58 and 60 in engagement with each other. The adjusting gear 32 is rotated by means of its adjustment shaft 36. When the adjustment gear 32 rotates, the teeth 52 on an inner surface of the adjusting ring are engaged and rotate the adjusting ring 24 relative to the pressure plate 22. When the adjusting ring 24 moves circumferentially relative to the pressure plate 22, the inclined surfaces 58 and 60 cooperate to raise the adjusting ring 24 relative to the pressure plate 22.

Figure 6:
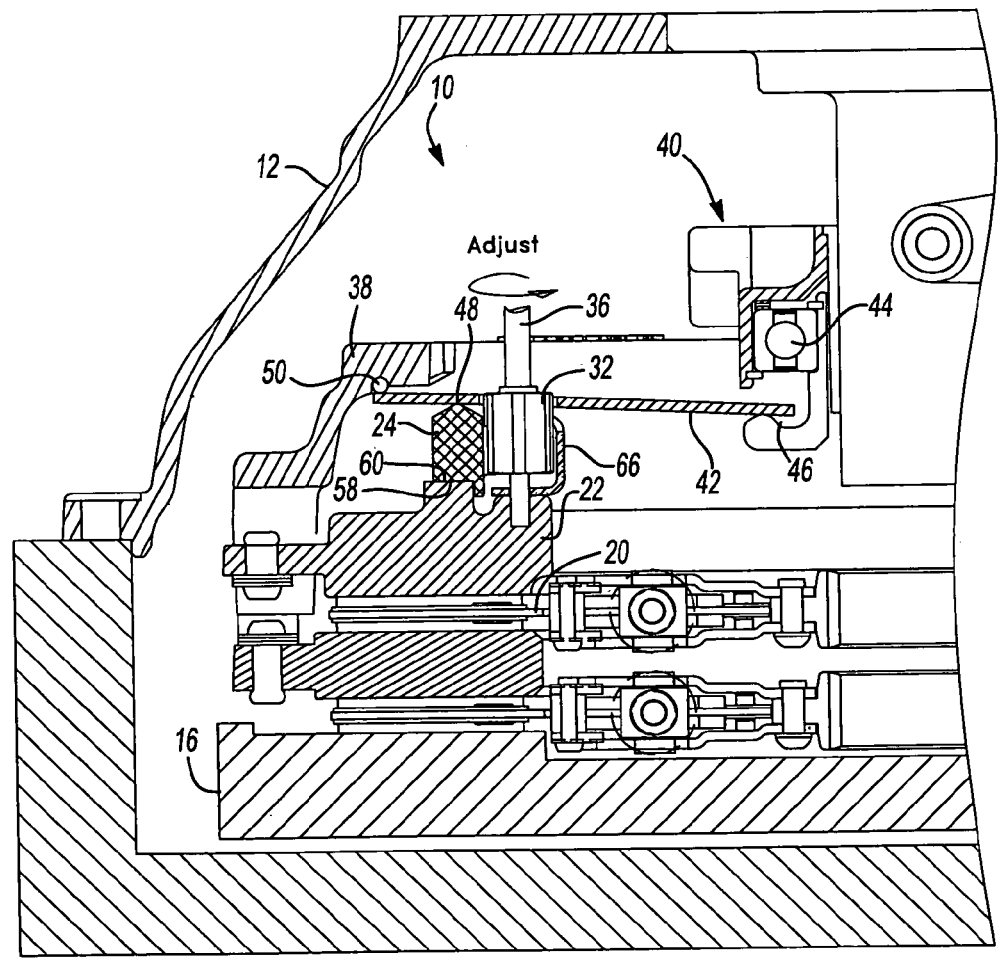
FIG. 6 is a fragmentary cross-sectional view of a manually adjustable clutch assembly having an assembled baffle.

Referring to FIG. 6, another alternative embodiment of the present invention is shown. A clutch assembly 10 includes a clutch 20 that engages a flywheel 16. The clutch assembly 10 is disposed within the transmission housing 12. The pressure plate 22 and adjusting ring 24 have inclined surfaces 58 and 60, as previously described with reference to FIGS. 4 and 5. An assembled contamination baffle 66 is assembled to the pressure plate 22 to shield the adjusting gear 32 and inclined surfaces 58 and 60 from contamination. The clutch release assembly 40 and diaphragm spring 42 cooperate with the cover 38 and pivot ring 50 as previously described. Rotating adjusting gear 32 causes the adjusting ring 24 to move circumferentially relative to the pressure plate 22 and thereby adjust the distance between the fulcrum 48 and the surface of the pressure plate 22 and engages the clutch 20.

Figure 7:
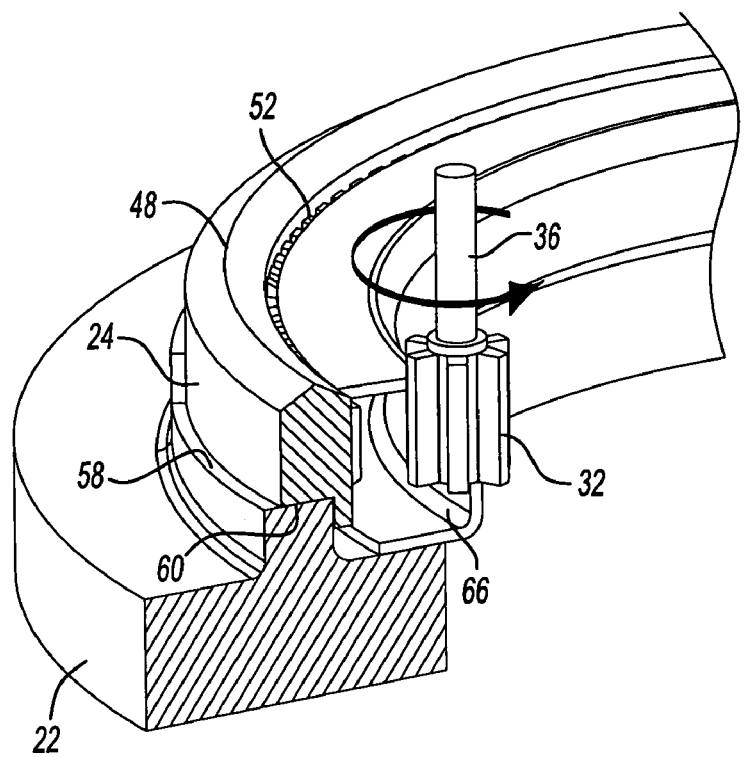
FIG. 7 is a fragmentary perspective view of a pressure plate, adjusting ring and adjusting gear having an assembled baffle.

Referring to FIG. 7, the adjustment mechanism and assembled contamination baffle 66 of the embodiment described with reference to FIG. 6 is shown in isolation and in greater detail. The adjustment shaft 36 is rotated, as shown by the arcuate arrow in FIG. 7, to rotate the adjusting gear 32. Rotation of the adjusting gear 32 is communicated by the teeth 52 to the adjusting ring 24 which causes the adjusting ring 24 to move circumferentially relative to the pressure plate 22. The inclined surfaces 58 and 60 move relative to each other to change the effective height of the pressure plate 22 and adjusting ring 24.

Figure 8:
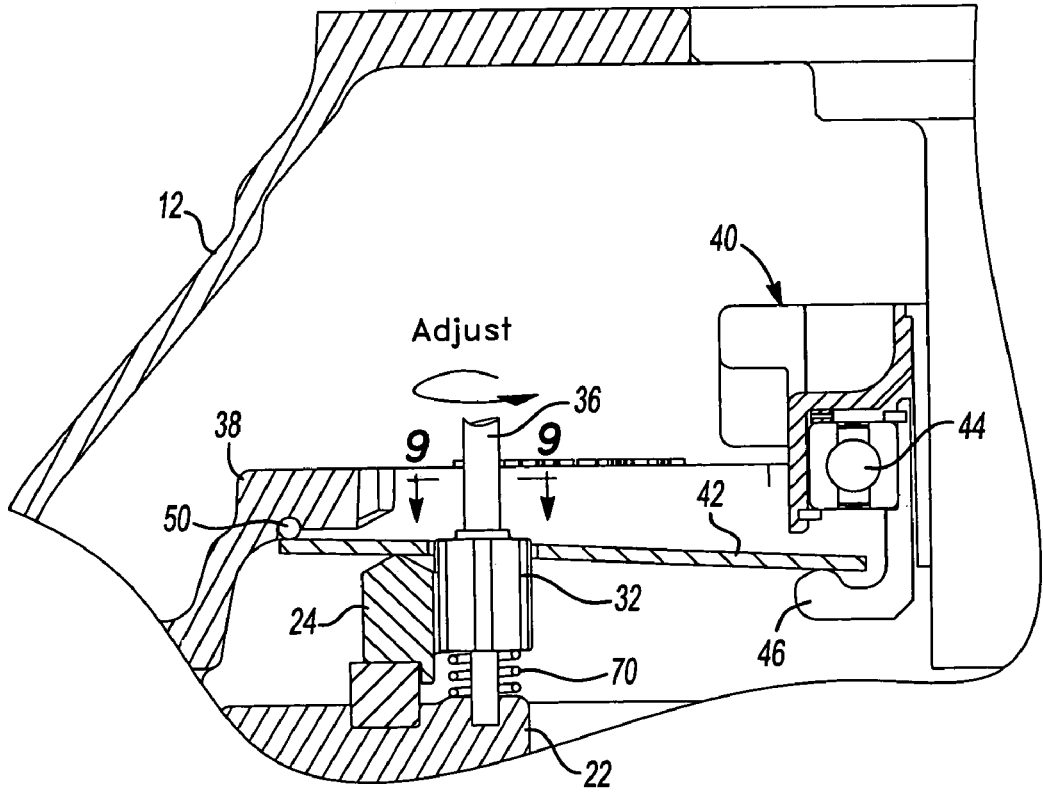
FIG. 8 is a fragmentary cross-sectional view of an adjusting gear that engages the diaphragm spring to lock the gear in place.

Referring to FIG. 8, yet another embodiment of the invention is shown that features a locking connection between the adjusting gear 32 and diaphragm spring 42. The pressure plate 22 receives one end of adjustment shaft 36. The adjusting gear 32 engages the adjusting ring 24 but must be pushed downwardly against the force of a spring 70 to disengage the adjusting gear 32 from the diaphragm spring 42.

Figures 9, 10:
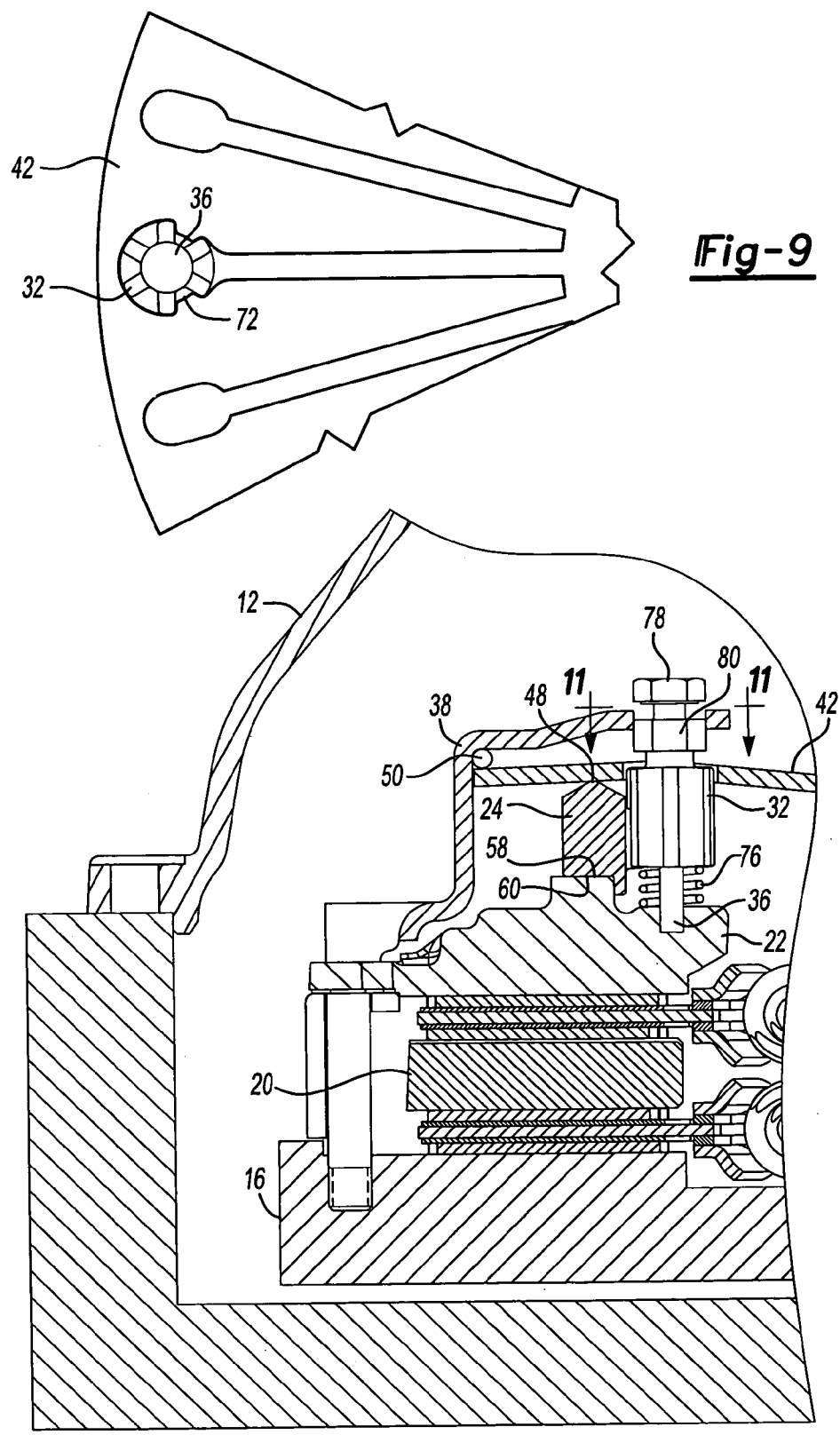
FIG. 9 is a fragmentary plan view of a diaphragm spring and adjusting gear with interlock elements.
FIG. 10 is a fragmentary cross-sectional view of a manually adjustable clutch having an adjustment gear that interlocks with the clutch housing.

As shown in FIG. 9, the diaphragm spring 42 has interlocking tabs 72 that are interlocked with the adjusting gear 32 to prevent rotation of the adjustment shaft 36.

Referring to FIGS. 10 and 11, another embodiment of the invention is shown with a different locking arrangement for locking adjusting gear 32 by engagement with the cover 38. The clutch 20, flywheel 16 and diaphragm spring 42 all operate as previously described with reference to FIGS. 4–7. The adjustment mechanism, including the inclined surfaces 58 and 60 of the pressure plate 22 and adjusting ring 24, all function in the same manner as previously described with reference to FIGS. 4–7. The adjusting gear 32 in this embodiment is biased by a spring 76 into a locking position wherein a hex head 78 used to turn adjustment shaft 36 includes a hex head interlock 80. The hex head interlock 80 is biased into engagement with a hex hole 82 formed in the cover 38. When the hex head 78 is engaged by a socket wrench and pressed downwardly to overcome the biasing force of the spring 76, the adjusting gear 32 is free to rotate and cause the adjusting ring 24 to move relative to the pressure plate 22. However, when the adjustment is complete, the spring 76 biases hex head interlock 80 into engagement with the hex hole 82 thereby preventing rotation of the adjustment mechanism. As shown in FIG. 11, the hex head interlock 80 is engaging the hex hole 82 in the cover 38. The diaphragm spring is also shown.

Referring to FIGS. 12, 13a and 13b, an additional embodiment of the invention is shown that features a different locking mechanism to prevent unwanted movement of the adjustment mechanism. In this embodiment, the clutch 22, flywheel 16 and diaphragm spring 42 all function as previously described. The adjustment mechanism is similar to that described with reference to FIGS. 4–7 above wherein the pressure plate 22 and adjusting ring 24 are movable relative to each other on inclined surfaces 58 and 60. In this embodiment, a locking adjustment gear 86 is assembled to the pressure plate 22. An access hole 88 is provided through the diaphragm spring 42 so that a hex head socket wrench may be inserted through diaphragm spring 42 to engage an adjustment bolt 90 that secures locking adjusting gear 86 to the pressure plate 22. Adjustment bolt 90 has a hex head 92 that is received in the hex socket 94. A bolt head lock 96 is provided in the base of the hex socket 94. The bolt head lock 96 engages the hex head 92 of the bolt 90 to lock adjusting gear 86 in place except for when the adjusting gear is being used to adjust the clutch. A beveled washer 98 biases the adjusting gear 86 into its locking position wherein the hex head 92 of the adjustment bolt 90 is prevented from rotation by the bolt head lock 96.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A manually adjustable clutch assembly, comprising:
   a housing having a cover that has a pivot ring;
   a clutch having a plurality of clutch plates that are shifted in an axial direction between an engaged torque transferring position and a disengaged non-torque transferring position;
   a pressure plate that is moveable relative to the clutch in the axial direction, the pressure plate having a contamination excluding baffle;
   an adjusting ring having a first inclined portion that engages a second inclined portion on the pressure plate, the adjusting ring having a fulcrum, and the baffle being disposed radially inboard of the adjusting ring;
   a clutch release system having a diaphragm spring and an axially shifted release bearing assembly, the release bearing assembly having an anti-friction bearing, the diaphragm spring engaging the fulcrum of the adjusting ring and being pivoted on the pivot ring of the cover when the release bearing assembly is shifted to shift the clutch between the engaged position and disengaged position; and
   an adjusting gear engaging the adjusting ring to cause the adjusting gear to move circumferentially relative to the pressure plate wherein the first and second inclined portions change the axial spacing of the fulcrum relative to the clutch, the adjusting gear having an axis of rotation oriented in the axial direction and being accessible from outside of the housing to allow the clutch to be manually adjusted without opening the housing.

2. The manually adjustable clutch of claim 1, wherein the adjusting gear engages the adjusting ring on the opposite axial side of the diaphragm spring from a location where the adjusting gear is accessible from outside of the housing.

3. The manually adjustable clutch of claim 1 wherein the first and second inclined surfaces are screw threads.

4. The manually adjustable clutch of claim 1 wherein the first and second inclined surfaces are ramp surfaces.

5. The manually adjustable clutch of claim 1 wherein the adjusting gear is a gear disposed on a shaft that is piloted in a hole in the pressure plate on the inner end of the shaft and has a tool engagement feature on the outer end of the shaft that may receive a tool that is used to rotate the gear.

6. The manually adjustable clutch of claim 5 wherein the adjusting ring has a plurality of gear teeth that are engaged by the gear of the adjusting gear, wherein rotation of the adjusting gear causes the adjusting ring to rotate.

7. The manually adjustable clutch of claim 6 wherein the plurality of gear teeth extend at least partially circumferentially around the adjusting ring.

8. The manually adjustable clutch of claim 1 wherein the baffle is a cast portion of the pressure plate.

9. The manually adjustable clutch of claim 1 wherein the baffle is an annular member that is assembled to the pressure plate.

10. The manually adjustable clutch of claim 1 wherein the adjusting gear has a lock that selectively prevents rotation of the adjusting gear and the adjusting ring.

11. The manually adjustable clutch of claim 10 wherein the lock is provided by the adjusting gear that has a tool engagement head that engages the housing in a first position to lock the adjusting gear, wherein the tool engagement head is moved to a second position in which the tool engagement head does not engage the housing, the adjusting gear being normally biased to the first position but being shifted to the second position when a tool engages the head to turn the head.

12. The manually adjustable clutch of claim 11 wherein the adjusting gear is disposed in the housing but is accessible by a tool that is inserted axially through a bore in the housing and an opening in the diaphragm spring.

13. The manually adjustable clutch of claim 12 wherein a tool engaged head is provided that is rotatable with the adjusting gear.

14. A manually adjustable clutch assembly, comprising:
- a housing having a cover that has a pivot ring;
- a clutch having a plurality of clutch plates that are shifted in an axial direction between an engaged torque transferring position and a disengaged non-torque transferring position;
- a pressure plate that is moveable relative to the clutch in the axial direction;
- an adjusting ring having a first inclined portion that engages a second inclined portion on the pressure plate, the adjusting ring having a fulcrum;
- a clutch release system having a diaphragm spring and an axially shifted release bearing assembly, the release bearing assembly having an anti-friction bearing, the diaphragm spring engaging the fulcrum of the adjusting ring and being pivoted on the pivot ring of the cover when the release bearing assembly is shifted to shift the clutch between the engaged position and disengaged position; and
- an adjusting gear engaging the adjusting ring to cause the adjusting gear to move circumferentially relative to the pressure plate wherein the first and second inclined portions change the axial spacing of the fulcrum relative to the clutch, the adjusting gear having an axis of rotation oriented in the axial direction and being accessible from outside of the housing to allow the clutch to be manually adjusted without opening the housing, wherein the adjusting gear has a lock that selectively prevents rotation of the adjusting gear and the adjusting ring, and wherein the lock is a portion of the diaphragm spring that is engaged by the adjusting gear, the adjusting gear having a spring that biases the gear into engagement with the diaphragm spring.

* * * * *